April 25, 1950     F. R. COMPOSTO     2,505,230
EDUCATIONAL TOY

Filed April 14, 1947     3 Sheets-Sheet 1

INVENTOR.
Frank R. Composto
BY Kniesner, Hoag & Carlson
ATTORNEYS

April 25, 1950  F. R. COMPOSTO  2,505,230
EDUCATIONAL TOY
Filed April 14, 1947  3 Sheets-Sheet 2
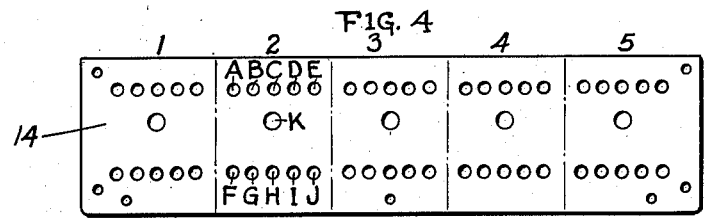
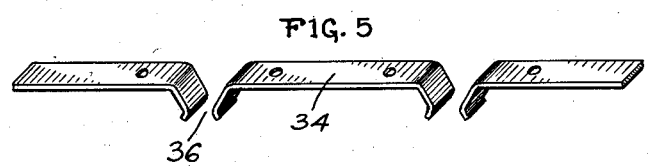
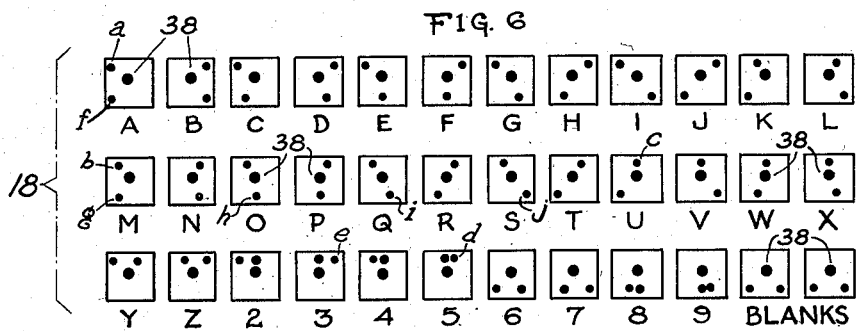
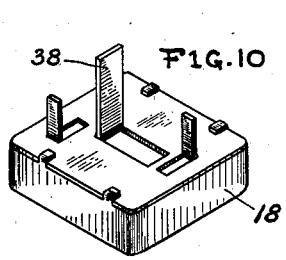
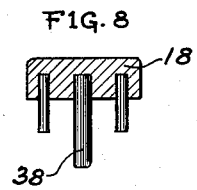
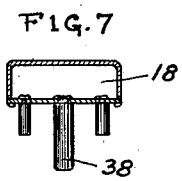
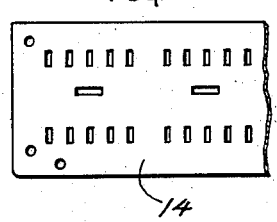
INVENTOR.
Frank R. Composto
BY Kniesner, Haag & Carlson
ATTORNEYS April 25, 1950   F. R. COMPOSTO   2,505,230
EDUCATIONAL TOY
Filed April 14, 1947   3 Sheets-Sheet 3
FIG.12
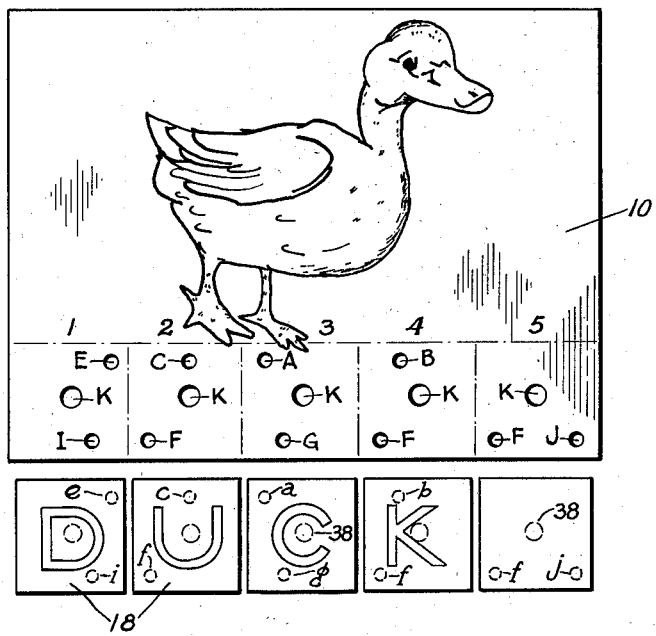
FIG.13
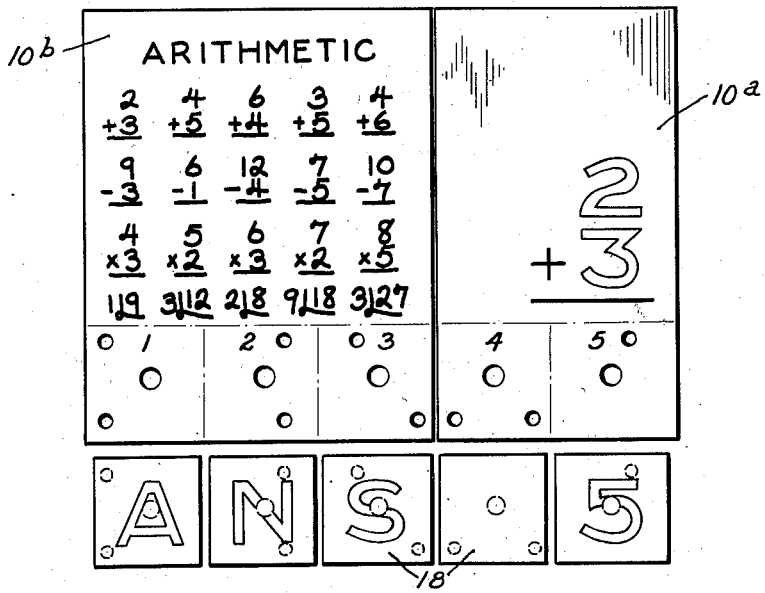
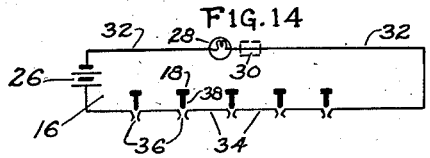
FIG.14
INVENTOR.
Frank R. Composto
BY Knierner, Hoag & Carlson
ATTORNEYS Patented Apr. 25, 1950

2,505,230

UNITED STATES PATENT OFFICE 2,505,230

EDUCATIONAL TOY

Frank R. Composto, Brooklyn, N. Y.

Application April 14, 1947, Serial No. 741,266

5 Claims. (Cl. 35—35)

This invention relates to a toy or game requiring the selection and arrangement of certain indicia, such as letters or numerals, in relation to a given indicium. More particularly it relates to an educational toy or game adapted to indicate by a signal, such as a light or a buzzer, when a pictorially or graphically presented question or problem has been correctly answered or solved, as for example by correctly selecting and arranging the letters comprising the name of a pictorially represented object, or when indicia giving the correct answer to a problem, as for example a problem in arithmetic, have been selected and properly arranged.

An object of the invention is to provide a simple toy or game of the above mentioned kind.

Another object of the invention is to provide such a toy or game wherein an error or errors in selection of indicia to identify a given object or to answer a given problem will be indicated immediately.

Another object of the invention is to provide a device of the above mentioned kind which is flexible and may be used with a variety of different indicia bearing members which pose a variety of questions or problems to be solved, such as objects the names of which are to be spelled, arithmetic problems to be solved etc.

Another object of the invention is to provide an improved device of the above mentioned kind.

Other objects of the invention will be in part obvious or in part pointed out hereinafter.

The invention accordingly consists in the features of construction, combinations of elements, arrangements of parts, and in the several steps and relation and order of each of said steps to one or more of the others thereof, all as will be pointed out in the following description, and the scope of the application of which will be indicated in the following claims.

The invention will best be understood if the following description is read in connection with the drawings, in which, Figure 1 is a plan view of one embodiment of the invention;

Figure 4 is a detail view showing a guide plate which may be employed;

Figure 5 is a detail view showing strips of conductive material forming part of an electric circuit and comprising circuit gaps;

Figure 6 shows a number of blocks identified by letters, numerals, and as blanks respectively, each provided with a circuit closing pin and with one or more position key pins;

Figure 7 is a detail of a block made of metal stampings with round pins secured therein as by peening;

Figure 8 is a detail of a block made of wood, or plastic with round pins fitted therein;

Figure 9 is a detail view of a wooden block with nail type pins driven therein;

Figure 10 is a detail view made of metal stampings with flat pins cut out of and bent up from one of the metal stampings;

Figure 11 is a detail view partly broken away of a guide plate, similar to the one shown in Figure 4, but with slots instead of round holes adapted to receive the flat pins of blocks such as that shown in Figure 10;

Figure 12 is a plan view of an indicium bearing card, shown as part of the assembly illustrated in Figure 1, punched with holes adapted to receive the pins of indicia bearing blocks when the latter are properly selected and arranged to identify the indicium on said card;

Figure 13 is a plan view of a plurality of cards adapted to be substituted in place of the card shown in Figure 12 and presenting a problem in arithmetic; and Figure 14 is a diagrammatic view showing a circuit adapted to be closed when the correct name, sum or other answer has been made by selecting and positioning the proper indicia bearing blocks and to give a signal indicating the correct answer.

The word "card" is used herein in a broad sense to indicate a member on which is depicted an object to be spelled or a problem to be solved by the selection and arrangement of "blocks" bearing letters, numerals etc.

The word "block" is used herein broadly to indicate a member adapted to be selected and arranged with other blocks to fill a given space and spell the name of an object depicted on a "card," or to solve a problem shown on a "card" or to form an arrangement of indicia related to an indicium on a "card."

Figure 1:
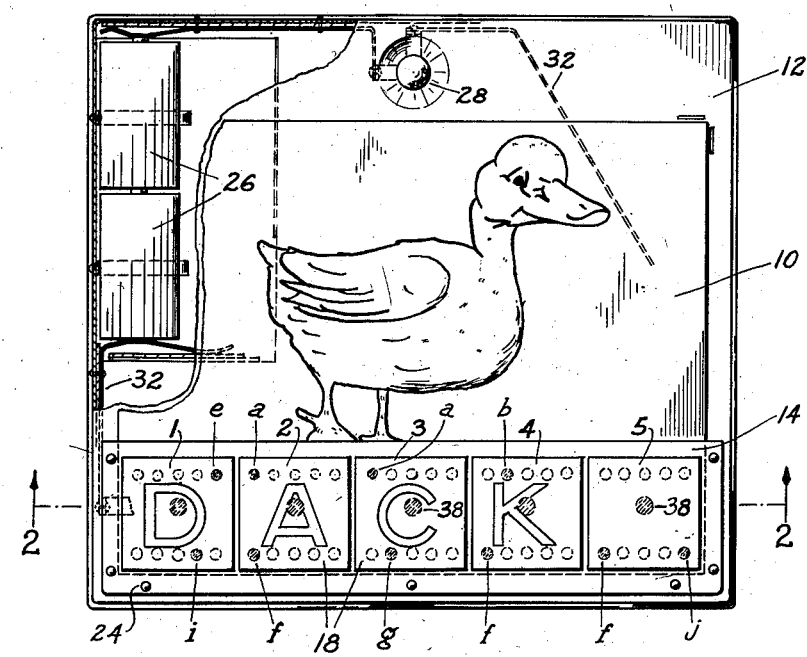

The embodiment of the invention illustrated in the drawings comprises one or more cards 10, graphically presenting an object, the name of which is to be spelled, such for example as the picture of a duck shown on card 10 illustrated in Figures 1 and 12, or a problem to be solved, such for example as a problem in arithmetic, illustrated on card 10$^a$, shown in Figure 13, with a supplementary card 10$^b$; each card is punched along one margin with groups of perforations the disposition of which is related to an indicium depicted on the card; a support surface 12 for the cards, preferably including a perforated guide plate 14 spaced above it so that one of said cards 10, or a combination of cards such as 10ᵃ and 10ᵇ, may be positioned on the plate with a portion, or portions, thereof extending under said guide plate and provided with a number of groups of perforations each of the same pattern; an electric circuit 16 (Figures 2 and 14); and a number of blocks 18, most of which carry letters or numerals and all of which carry pins which may be inserted through some of the perforations in the guide plate, and will register with and extend through the perforations provided in the cards 10, and 10ᵃ and 10ᵇ, respectively, when blocks relating to the indicium on the card on the support surface have been correctly selected and arranged on the guide plate. The said blocks and said electric circuit are adapted to cooperate and complement one another so that when the several groups of perforations on the guide plate have been covered with blocks which correctly spell the name of the object shown on the card, or solve a problem graphically presented on the card etc. the electrical circuit will be closed and a signal will be given.

The surface 12 may comprise the top of a box-like closure 20, and the guide plate 14 may be supported above the surface 12 as by spacing members 22 and rivets 24. As shown in Figure 4 the guide plate is divided into five spaces, 1, 2, 3, 4, and 5, and each space is perforated with eleven holes comprising ten key positioning pin holes arranged in two parallel rows of five holes each A, B, C, D, E, and F, G, H, I, J, and a larger contact pin receiving hole K which is shown centrally positioned between said two rows of holes. Groups of holes similar to those in the guide plate 14 may be provided in the surface 12, and preferably the portion of surface 12 under the guide plate may be cut away to provide space for pins on blocks 18 to be inserted through perforations in the guide plate and in a card on said surface, as will be described. If the surface is perforated with holes corresponding to those in the guide plate and the surface is made of metal the holes in the surface should be made larger than those in the guide plate to prevent a short circuit when the contact pins of the blocks 18 are inserted as will be described.

Each card 10, or combination of cards 10ᵃ and 10ᵇ, has along its lower margin groups of perforations equal in number to the groups of perforations provided in said guide plate. The perforations comprising a group of perforations in a card correspond to some of the perforations comprising each group in the guide plate and so are aligned with one or more of the key positioning pin holes A—J, and each group of holes in a card has a hole adapted to be in register with a hole K in the guide plate when the card is properly positioned on the support surface. In Figure 12 the lower margin of card 10 therein illustrated is shown divided into five spaces similar to spaces 1—5 into which the guide plate is divided, and in each space is a combination of perforations individual to the particular card and the object, problem etc. depicted thereon and which correspond to some of the perforations in the corresponding space in the guide plate, and these holes for convenience are identified by the same numbers as the holes in the guide plate with which they correspond and with which they are in register.

The electric circuit 16 may desirably be completely contained within box-like member 20, and may comprise the battery 26, a signalling device such for example as the light 28, or buzzer 30, both indicated in Figure 14, the leads 32, and the conductive strips 34, which may be separately supported from the lower side of support surface 12. The ends of said strips 34 are bent downwardly so that the adjacent ends of adjoining strips form a socket adapted to receive and press against a metal pin, the circuit being complete except for said sockets which constitute gaps 36 in the circuit. The strips 34 are disposed so that the gaps 36 are equal in number to the number of groups of holes in the guide plate and in each card 10, or combination of cards 10ᵃ and 10ᵇ, and are aligned with the holes K respectively.

As shown in Figure 6 thirty-six blocks are provided, the number of which of course may be varied as desired to provide duplicates or to support a wide variety of indicia. All the blocks indicated in Figure 6 except two are indicium bearing blocks serving respectively to carry the letters of the alphabet and numerals 1 to 10 inclusive, the letters I and O being also conveniently employed for the numerals one and zero. The two blank face blocks are used to fill in the spaces left on the guide plate, when the word to be spelled or the problem to be solved does not require sufficient indicia bearing blocks to fill the spaces i. e. cover the groups of holes provided in the guide plate and in the cards respectively. In the embodiment of the invention as shown all five spaces 1, 2, 3, 4, and 5 must be covered to make the toy operative to signal when a correct answer has been given, and if only four indicia bearing blocks are required for the answer the fifth space is filled with a blank-face block, the fifth group of holes in the card being a combination adapted to receive the pins on a blank-face block.

Each and every block is provided with one or more key positioning pins, $a$, $b$, $c$, $d$, $e$, and $f$, $g$, $h$, $i$, $j$, corresponding in position to the holes A—J in the guide plate and in the margins of the cards, and a central elongated pin 38 of conductive material. Pin 38 of each block is adapted to register with any hole K in the guide plate and so with any hole K in a card positioned so that its holes are in alignment with those in the guide plate, and the key positioning pin or pins on each block will register with and enter holes comprising each group of holes in the guide plate but will register with and so can enter only a particular combination of holes in a card. This combination of key positioning pins and holes will be found only in a block and in the space of a card perforated to receive that particular block. When this block is applied to the particular space all the pins on the block will register with holes in the card (as well as with holes in the guide plate) and so the block will be fully seated on the guide plate, as are the first, third, fourth and fifth blocks shown in Figure 2, reading from the left. When thus fully seated the contact pin 38 will extend into the gap 36 which is aligned with the holes K in the guide plate and the card through which pin 38 extends, and will bridge the gap thus completing the circuit through it. Thus it will be seen that when blocks 18 which correctly relate to the indicium on a card in place between surface 12 and guide plate 14 are selected and correctly arranged their pins 38 will enter and bridge all of the gaps 36 thereby completing the electric circuit and causing a signal to be actuated. If a wrong block has been selected it will not fully seat on the guide plate since its key positioning pins will strike an imperforate portion of the card, like the second block shown in Figure 2, and the contact pin 38 will not extend far enough through the card to close the gap beneath it and the lack of a signal, as well as the position of the improperly selected or positioned block, will give notice that the name of the object, or the answer to the problem etc. has not been correctly given.

Figure 2:
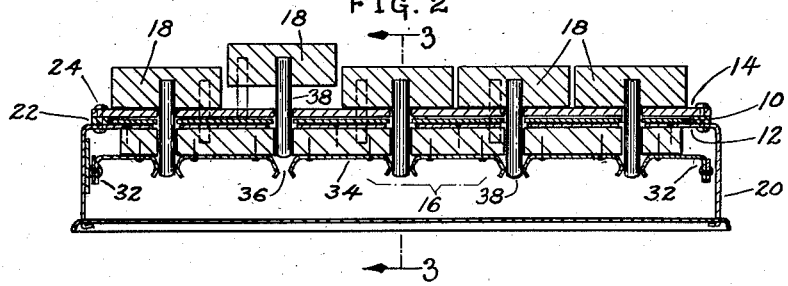
Figure 2 is a vertical cross section taken on the line 2—2 of Figure 1.
Figure 3:
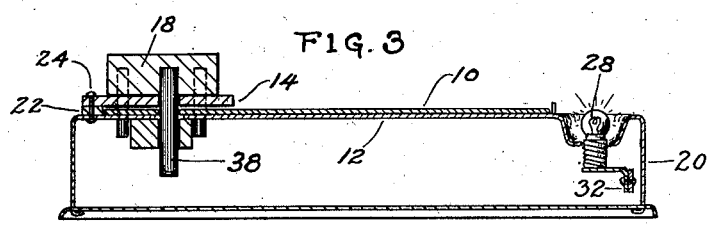
Figure 3 is a vertical cross section taken on the line 3—3 of Figure 2.

As illustrated in Figures 1 and 2 the problem or question is to correctly spell the word "duck," the graphic representation of which appears on the card 10 which has been inserted in its place on surface 12, with its lower portion, in which pin-receiving holes have been punched, extending under guide plate 14 so that its holes are vertically aligned with some of the holes in the guide plate 14 above, and the holes or cut out in surface 12. Because an incorrect block 18 bearing the letter "A" instead of the correct block 18 bearing the letter "U" has been selected and positioned over the second space on the guide plate 14 it cannot be seated but instead is held up above the level of the correctly selected and positioned blocks bearing the letters "D," "C" and "K," since one of the key positioning pins on the block is not aligned with a hole in the card even though aligned and inserted through a hole in the guide plate and thus strikes against an imperforate portion of the card. As a consequence the contact pin 38 does not reach the circuit gap 36 with which it is aligned to close it.

Since as shown in Figure 1, space is provided for receiving five blocks 18 and since the correct word for spelling the indicium i. e. the duck depicted on the card 10 which has been selected, is a word of only four letters, a blank block 18 is selected and positioned to fill the fifth space.

Instead of an indicium bearing card 10 graphically illustrating an object to be spelled other cards presenting a variety of other questions or problems may be used. Thus as shown in Figure 13 card 10ᵃ bearing a problem in arithmetic may be substituted for card 10. If the answer to this problem is correctly given by a single numeral or digit, (the numeral 5 in the problem in addition depicted on card 10ᵃ) the fourth space from the left in Figure 13, next to the space correctly filled by block 18 bearing the numeral 5, may be filled with a blank block 18. The card 10ᵇ is supplied merely to supplement cards like 10ᵃ having thereon problems, which require an answer employing only one or two numerals or letters. Card 10ᵇ is punched with three groups of holes adapted to receive in spaces 1, 2 and 3 the pins of blocks bearing the letters "a," "n" and "s" respectively, thus spelling the abbreviation of the word "answer." This is an arbitrary selection and is merely illustrative.

The blocks 18, and particularly the formation or attachment of the key positioning and contact pins may be varied considerably as is illustrated in Figures 7 to 10. If members 18 are formed as illustrated in Figure 10 slots may be provided in the guide plate 14, and in the cards (and in surface 12 if it is not cut out) instead of round holes, and a plate formed with such slots is illustrated in Figure 11.

It will thus be seen that there has been provided by this invention a method and apparatus in which the various objects hereinabove set forth together with many thoroughly practical advantages are successfully achieved. As various possible embodiments might be made of the mechanical features of the above invention and as the art herein described might be varied in various parts, all without departing from the scope of the invention, it is to be understood that all matter hereinbefore set forth or shown in the accompanying drawings is to be interpreted as illustrative and not in a limiting sense.

What I claim is:

1. A toy comprising an indicia bearing card, a support for the card and a guide plate spaced above said support so that a portion of said card may be inserted between the support and the plate, a series of similar groups of holes in said guide plate each group being arranged in a definite pattern, the portion of said card which is inserted between said surface and the guide plate having a series of groups of holes equal in number to the number of groups of holes in said guide plate but each comprising a combination of some of the holes comprised by each group of holes in said guide plate, the holes comprising each group of holes in said card being vertically aligned with the corresponding holes of the groups of holes in said guide plate, and a number of blocks each having projecting therefrom a combination of pins disposed similarly to one of the groups of holes in said card, whereby when correctly positioned said block may be disposed on said guide plate with its lower surface in contact with said guide plate.

2. A toy comprising an indicia bearing card, a support for the card including a guide plate spaced above said support so that a portion of said card may be inserted between the support and the plate, a series of groups of holes in said guide plate each group being arranged in a definite pattern, the portion of said card which is inserted between said surface and the guide plate having a series of groups of holes equal in number to the number of groups of holes in said guide plate but each comprising a combination of some of the holes comprised by each group of holes in said guide plate, the holes comprising each group of holes in said card being vertically aligned with the corresponding holes of the groups of holes in said guide plate, and a number of blocks each having projecting therefrom a combination of pins disposed similarly to one of the groups of holes in said card and including an elongated pin of electrically conductive material, whereby when correctly positioned said block may be disposed on said guide plate with its lower surface in contact with said guide plate, the said support surface for the card serving also to support an electrical circuit, including a signalling means, complete except for a series of gaps equal in number to the number of groups of holes in said card, said gaps being vertically aligned respectively with a hole in each of said groups of holes in the guide plate and in said card whereby when all said blocks are in correct position on the guide plate the said electrically conductive pins carried by said blocks respectively will project through the guide plate and through the card into the respective gaps in said circuit, thereby bridging said gaps and completing the circuit.

3. A toy comprising a number of indicium bearing cards each having a given number of groups of holes punched therein and arranged in combination of patterns individual to the card, pin bearing members some of which carry indicia related to indicium on said cards respectively, a support surface adapted to receive said cards one at a time, and an electrical circuit beneath said support including a signalling device and a number of gaps each aligned with one hole comprising each of said groups of holes in the card, the pins borne by each of said pin bearing members comprising one or more key positioning pins and an electrically conductive gap-closing pin disposed in a pattern similar to the disposition of one group of holes in one of said cards, said gap-closing pin being adapted when the block by which it is carried is positioned over the card having a correspondingly disposed group of holes with its key positioning pins extending through the holes of said group of holes in the card, to extend through said card into one of said gaps and thereby serve to close the circuit through said gap, whereby when blocks have been correctly selected and positioned over all the groups of holes in said card the circuit will be completed and said signalling device actuated.

4. In combination a support surface having a portion thereof cut away beneath a guide plate, a guide plate spaced above said surface and having a number of groups of perforations therein, the perforations of each group being similarly disposed and including perforations adapted to receive the pins of any one of a number of blocks to be selected and arranged in relation to an indicium or indicia on one of a group of cards, a card having therein perforations corresponding to some of the perforations of said guide plate, positioned on said surface with its perforate portion between said guide plate and the cut away portion of said surface, and with each of the perforations comprising its group of perforations in register with some of the perforations of the respective groups of perforations in said guide plate, a number of blocks having pins projecting therefrom and disposed in combinations individual to said blocks respectively, the combination of pins on each block corresponding to the combination of perforations comprising one group in one of said cards, and an electric circuit disposed beneath said surface and beneath the group of holes in the guide plate and in a card positioned on said surface, complete except for gaps, one of the pins carried by each of said blocks being adapted when the block is correctly selected and positioned on said guide plate with its pins inserted through some of the perforations of a group of perforations in said guide plate and through the group of holes in the card having the combination of perforations corresponding to the disposition of pins on said block, to extend into and bridge one of said gaps thereby completing the electric circuit through said gap.

5. An educational toy comprising indicia bearing cards punched with one or more groups of holes adapted to receive the pins of blocks having pins disposed similarly to the respective combinations of holes in the card, a surface having a number of groups of holes therein disposed so that said cards may be successively positioned thereon with the holes of each combination of holes in a card in register with some of the holes comprising each group of holes in said surface, an electric circuit including a signalling device adapted to be actuated when said circuit is closed and comprising strips of conductive material spaced apart forming gaps vertically aligned with a hole in each group of holes in said cards respectively, and a number of blocks adapted to be selected and arranged in relation to indicia depicted on said cards respectively, each block having a contact pin adapted to enter one of the holes in each group of holes in each card, and having one or more key positioning pins adapted when the block is properly selected and positioned to register with and enter holes comprising a particular group of holes in a particular card the contact pins of said blocks being sufficiently long so that, when the key positioning pin or pins of a block have been brought into register with, and inserted in, corresponding holes in a card, the contact pin will extend through the hole of said group which is aligned with said circuit gap and will thereby close the gap and complete the circuit therethrough.

FRANK R. COMPOSTO.

REFERENCES CITED

The following references are of record in the file of this patent:

UNITED STATES PATENTS

| Number | Name | Date |
|---|---|---|
| 1,040,174 | Von Saalfeld | Oct. 15, 1912 |
| 1,629,635 | Parsons | May 24, 1927 |

Certificate of Correction

Patent No. 2,505,230 April 25, 1950

FRANK R. COMPOSTO

It is hereby certified that error appears in the printed specification of the above numbered patent requiring correction as follows:

Column 8, line 48, list of references cited, for the patent number "1,040,174" read *1,041,174*;

and that the said Letters Patent should be read as corrected above, so that the same may conform to the record of the case in the Patent Office.

Signed and sealed this 27th day of February, A. D. 1951.

[SEAL]

THOMAS F. MURPHY,
*Assistant Commissioner of Patents.*